June 13, 1933.   V. POGIOLI ET AL   1,913,896
CONTROL APPARATUS FOR THE TROLLEY POLE OF TRAMWAY CARS AND THE LIKE
Filed Dec. 29, 1930   3 Sheets-Sheet 2
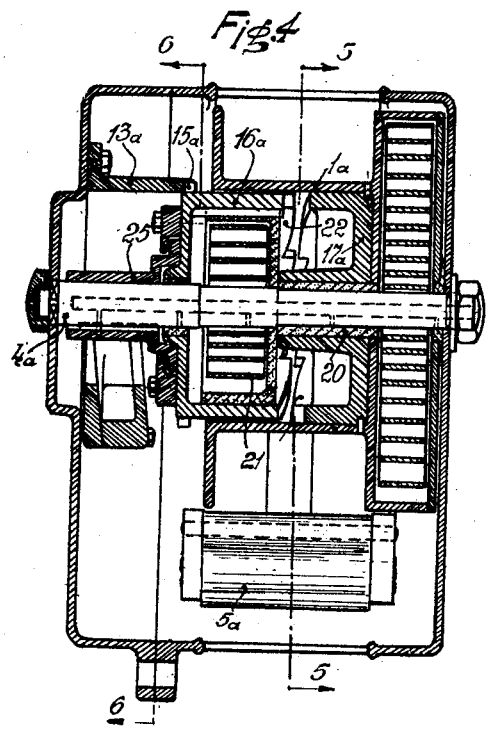
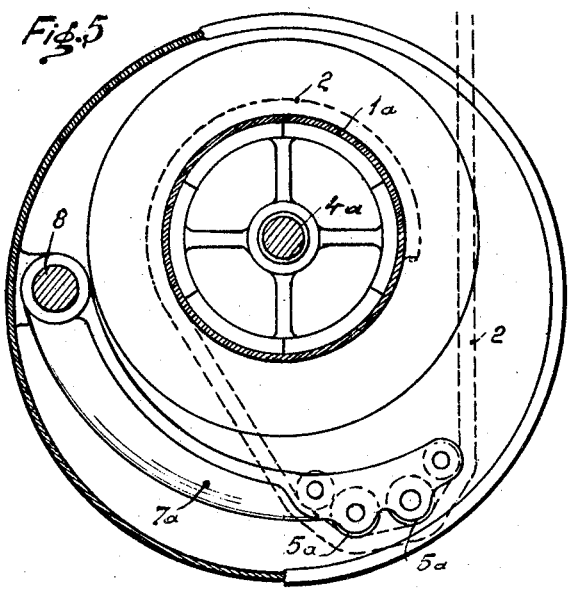
V. Pogioli
G. Parravicini
INVENTORS
By: Marks & Clerk
ATTYS.

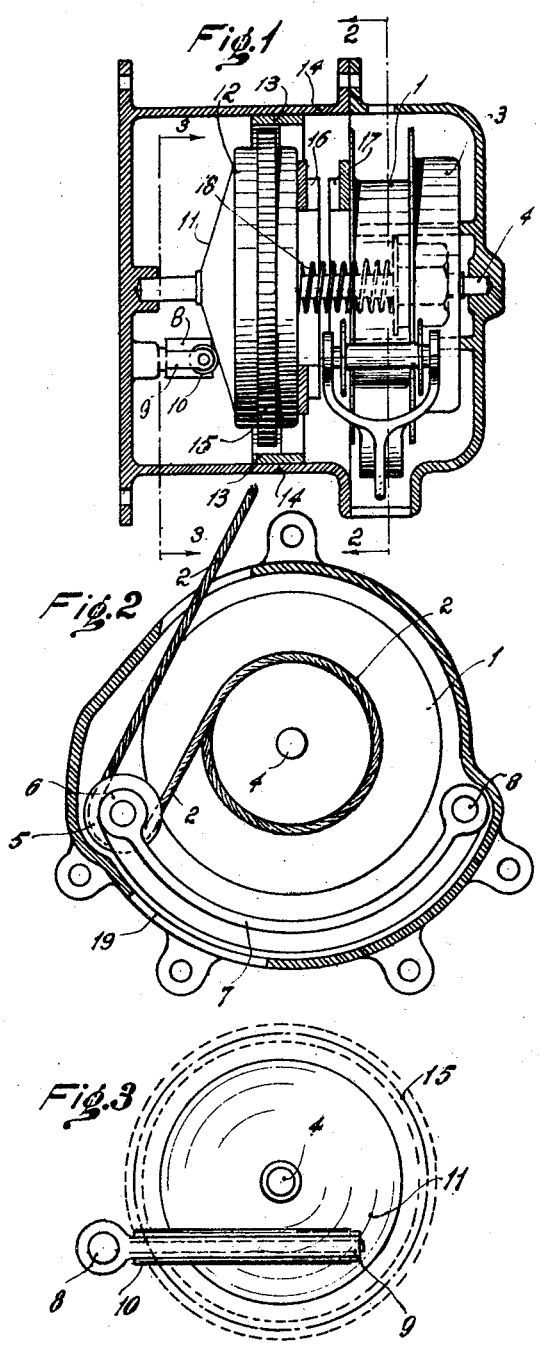

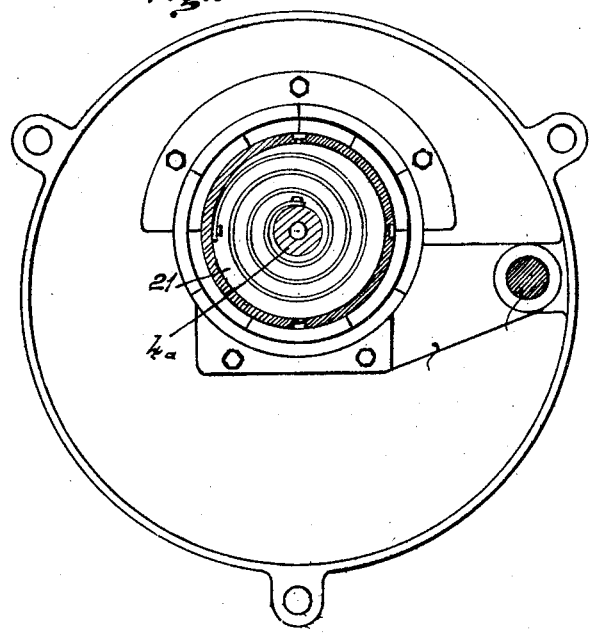
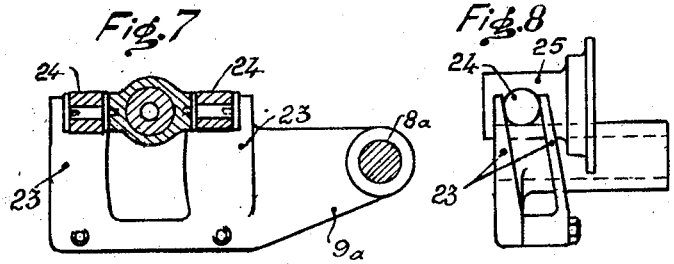

Patented June 13, 1933

1,913,896

UNITED STATES PATENT OFFICE

VITTORIO POGIOLI AND GIUSEPPE PARRAVICINI, OF MILAN, ITALY

CONTROL APPARATUS FOR THE TROLLEY POLE OF TRAMWAY CARS AND THE LIKE

Application filed December 29, 1930, Serial No. 505,386, and in Italy September 4, 1930.

The present invention relates to a control apparatus for the trolley pole of electric tramcars.

The invention solves the problem of exerting a pulling action on the retaining cable of the trolley pole when the trolley leaves the contact wire, so as to automatically oblige the pole to lower itself and to remain in lowered position until the tramwayman intervenes to re-establish the contact.

The apparatus according to the invention is essentially distinguished by the fact that the retaining cable, the bottom end of which is wound on a spring-loaded drum or bobbin in order to maintain the cable under normal tension conditions, is led over a member which under normal conditions remains in a determined position, whereas when the trolley springs off the contact wire and an extra-tension is put on said cable in consequence of the said springing off, the member above mentioned shifts its position whereby means are set into action which release a further springloaded member from its rest position and couple it up with the abovesaid drum or bobbin in such a manner that the complex, owing to the auxiliary action of the second spring-loaded member, exerts a reaction traction which overcomes the pole action, so that the cable is pulled downwardly and the trolley pole is consequently lowered.

The accompanying drawings illustrate, merely by way of example, an execution form of the invention and an improved alternative construction.

Figs. 1 to 3 show the first execution form and more precisely:

Fig. 1 is a longitudinal view of the apparatus, with the casing shown in section;

Fig. 2 is a cross section on the line 2—2 in Fig. 1;

Fig. 3 is a part cross section on the line 3—3 in Fig. 1;

Figs. 4 to 8 represent the improved alternative execution form, and more precisely;

Fig. 4 is a longitudinal section;

Fig. 5 is a section along the line 5—5 in Fig. 4;

Fig. 6 is a section along the broken line 6—6 in Fig. 4;

Fig. 7 is a detail figure and shows the clutch operating arrangement;

Fig. 8 is a cross section through Fig. 7.

Referring first to Figs. 1 to 3, I is the take-up drum or bobbin over which the cable 2 is wound; this bobbin stands under the action of a spring 3 and is keyed on the center shaft 4.

The cable 2 is led over a grooved pulley 5 revolvably mounted on the end 6 of an arm 7, the opposite end of which is adapted to pivot on an axis 8 excentrically situated relatively to the main shaft 4. Near its opposite end, the axis 8 carries a further arm 9, this arm being rigidly connected to the axis 8 as is also the arm 7. On the arm 9 a practically cylindrical roller 10 is mounted, this roller being in contact with the practically conical surface 11 of a roller 12. The roller 12 stands under the action of a spring which is capable of making it revolve on the shaft 4 whenever the roller 12 is released from the teeth 13 fixed to the apparatus casing 14, with which it comes into engagement by means of the toothed rim 15 provided on the periphery of the roller 12.

The roller 12 is likewise fitted with a side toothed-rim 16 adapted to engage a corresponding side toothed-rim 17 provided on the bobbin 1 so as to connect the bobbin 1 and the roller 12 in rotation and to make them run in unison when their springs expand.

The working of the apparatus is as follows:

Under normal conditions, the arm 7 occupies a certain position in which it is held by its end 6 by the cable 2, this position being determined by the equilibrium conditions between the turning moment due to the arm's own weight (and also, if required, to a spring) and the counteracting moment exerted by the tension of the cable 2 in consequence of the upward tension exerted on the trolley pole.—

When the trolley leaves the contact wire, the tension exerted by the cable 2 is considerably greater; for instance whereas the said tension under normal conditions is 1 kg., it becomes 9-10 kilos when the trolley leaves the contact wire. As a consequence, the arm 7 swings in upward direction, as indicated by the arrow —y— in Fig. 2. The arm 9, rigidly connected with the arm 7 in rotation, swings out to, through the conical surface 11, exert an axial pressure on the roller 12. Owing to this pressure, the roller 12 overcomes the action of the axial spring 18 and moves towards the bobbin 1. The teeth 15 of the peripheral rim of roller 12 disengage themselves from the holding teeth 13, while the side toothing 16 of the roller 12 gets into engagement with the side toothing 17 of the bobbin 1. The bobbin 1 and the roller 12 are now connected in rotation and the strong spring of the roller 12 develops its action to the effect of overcoming the 10–11 kilos pull exerted by the cable 2. The final result is that the cable is pulled downward and the trolley lowered. In this manner it is avoided, by simple means, that the trolley may strike the cables of the contact line, with its attendant dangers.

The now intervening tramwayman has nothing further to do than to hold the cable 2 with one hand to impart to the aggregate: bobbin 1—roller 12 with the other hand a rotation in a contrary direction to that of the expanding springs, thus acting upon the slack portion of the cable 2.—As a consequence, the spring of the roller 12 is re-wound and, owing to the antagonistic action of the spring 18, the roller 12 is restored into its rest position, in readiness for a fresh intervention.

In the alternative improved embodiment according to Figs. 4 to 8, the bobbin 1a, on which the cable 2 leading to the trolley pole is wound, is rigidly connected to the clutch-half 17a, this latter being lodged inside of the bobbin 1a and mounted on the main-shaft 4a through the intermediate of a cushion or packing 20. Opposite the clutch-half 17a there is arranged the other clutch-half 16a which is fitted with claws matching the claws of 17a, and besides is fitted with a set of teeth 15a for engagement with the locking rim 13a. The drum-like clutch-half 16a is slidable along the main shaft 4a and can move from the position in which it is shown on the drawings, viz. of engagement with the rim 13a, to the position of engagement with the clutch-half 17a.

Inside of the clutch-half 17a there is arranged in fixed position the spring 21 which is intended to cause the bobbin 1a to turn in cable-winding direction; this spring is enclosed in a casing 22, the periphery of which is provided with feathers 23 performing a double duty, namely that of guiding the axial movement of the clutch-half 16a and that of making the said casing fast for rotation with the clutch-half 16a and therewith also with the bobbin 1a.

The axial sliding of the clutch-half 16a is effected also here by an arm 7a, one end of which is acted upon by the cable 2 against the action of the arm's own weight. In this alternative embodiment the cable 2, instead of over a single grooved pulley, passes over a set of pulleys 5a in order to facilitate the sliding and lessen the wear. Further, the spindle 8a of the arm 7a is rigidly connected to an arm 9a (Figs. 7 and 8) carrying a fork 32, inside the shanks or prongs of which projecting rollers 24 are arranged, these rollers being fast with a muff 25 slidably mounted on the shaft 4a and invariably connected to the clutch-half 16a. In this manner, when the arm 7a is raised, also the arm 9a rises and, owing to the inclination of the shanks of the fork 23, the rollers 24 are pushed to the right, thus disengaging the clutch-half 16a from the toothed rim 13a and engaging it with the clutch-half 17a. Hence the rotation of the bobbin 1a in the direction of winding—in the cable 2. The bobbin is placed under the action of a spring 26 normally ensuring the tightness of the cable 2.

The mode of working of the apparatus is similar to that already described in connection with the former embodiment.—When the trolley 2 leaves the contact wire, the cable 2 is pulled in upward direction and draws the arm 7a upwardly, thus allowing the spring 21 to come into action. This spring expands and revolves the bobbin 1a in opposite direction, thus lowering the trolley pole.

In order to again bring the trolley into contact with the contact-wire, the tramwayman pulls the cable 2 in downward direction so as to release the arm 7a from the cable influence. The arm 7a then sinks through its own weight, wherewith the clutch-half 16a is slid to the left and brought into engagement with the locking toothed-rim 13a.

In practice, the apparatus may be fitted with means indicating the cable lengths, with means for protection against rain-water and so on, without departing from the spirit and scope of the invention.

Having now described our invention and how the same is to be carried out, what we claim as our invention is:

1. In an automatic trolley catcher, a casing, a spring-actuated drum rotatably mounted in the casing and on which the lower end of a trolley rope is adapted to be wound, a weighted arm arranged entirely within the casing and pivoted at one end eccentrically with respect to the drum and having its free end engaged with a loop of the trolley rope and having a limited free movement for holding the rope taut, a spring-actuated controlling and clutching mechanism in the casing and responsive to movement of said arm incident to the disconnection of the trolley pole for movement from a resting and loaded position into a coupled position with the drum in such a manner that the latter, owing to the auxiliary action of said spring-actuated mechanism, exerts a pulling reaction on the trolley rope and overcomes the antagonistic action exerted by the trolley pole, so that the trolley rope is pulled downwards.

2. In an apparatus according to claim 1, rollers arranged at the outer end of the arm in order to guide the trolley rope and facilitate its movement.

3. In an automatic trolley catcher, a casing, a spring actuated drum rotatably mounted in the casing and on which the lower end of a trolley rope is adapted to be arranged, a weighted arm having one end pivotally mounted eccentrically of the drum and within the casing and having its outer end en-engaged with a loop in the trolley rope for holding the latter taut, a combined controlling and clutching means mounted within the casing including a drum-like element normally clutched with the casing and slidably mounted with respect thereto, cooperative clutch members on the main drum and on the drum-like element, a main controlling spring acting on the drum-like element, and cooperative cam-like means between the weighted arm and the drum-like element for releasing the latter from the casing and clutching it to the main drum, at the time the weighted arm is moved incident to the disconnecting of the trolley pole, for bringing into action the main controlling spring to overcome the antagonistic action exerted by the trolley pole, substantially as and for the purposes set forth.

VITTORIO POGIOLI.
GIUSEPPE PARRAVICINI.